7083X
W. B. Fahnestock,
Surgical Instrument,
No Printed Specification Available
Patented May 25, 1832.
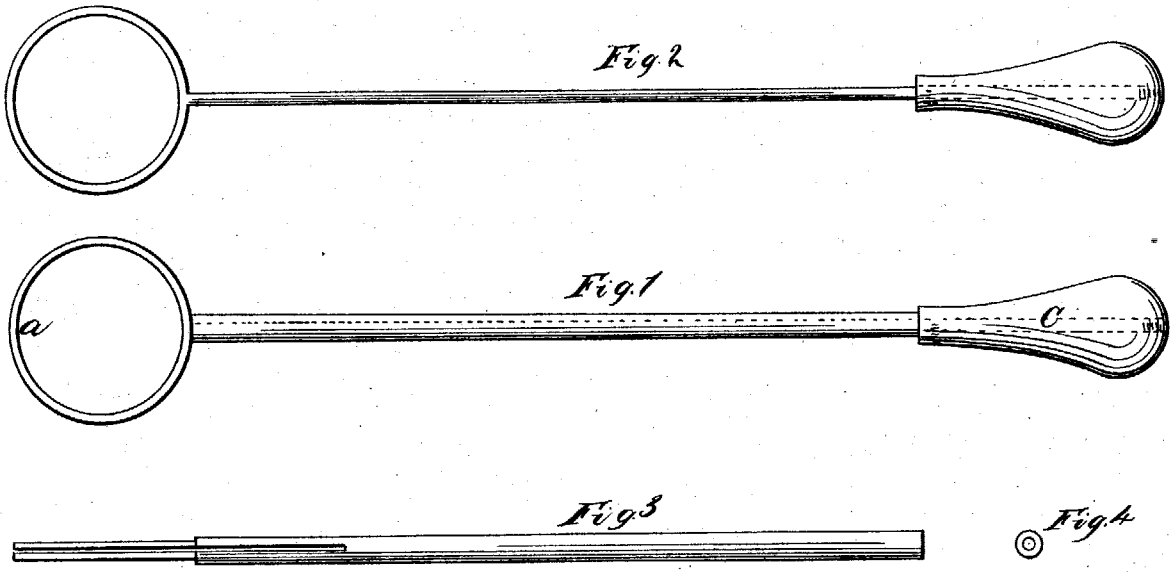
AM. PHOTO-LITHO. CO. N.Y. (OSBORNE'S PROCESS.)

7083X May 25. 1832 9

William B. Fahnestock of Lancaster . Penn:

Letters Patent.

The schedule referred to in these Letters Patent, and making part of the same containing a description in the words of the said William B. Fahnestock himself of his improvement in Surgery called Sector Tonsillarum.

---

Be it known that I. William B. Fahnestock of the City of Lancaster, County of Lancaster and State of Pennsylvania, have invented a new and useful improvement in Surgery called Sector Tonsillarum, and that the following is a full and exact description of the construction and operation of the said Instrument as invented by me. A piece of steel is formed of the length of five and a half inches and the thickness of one fifth of an inch or thereabouts neatly rounded and polished; on the one end thereof is a ring of an inch and a fourth in diameter, and about one sixtieth of an inch in thickness, is split in two equal halves, which split extends down the stem as far as the length of the diameter of the ring — A hole is then drilled up through the centre of the stem to about the size of one third of its diameter.

Another piece of steel is then formed of sufficient thickness to fit in the hole of this stem and on the one end thereof is a circular knife of the diameter above mentioned so thin as to fit in the split of the first mentioned ring.

The upper half of the inner edge of the circular knife is completely sharpened and when put to its place in the split of the first mentioned ring, has the appearance of one perfect ring. The stem of this center ring, extends through the first mentioned stem about an inch and three quarters; upon this part of a piece of ivory, with a hole in its centre through which this passes, is fastened by a small screw at each end forms the handle of the instrument.

By this handle the inner piece of the ring, is drawn down the split in the stem, and will thereby cut off any soft substance that may be placed in the ring, previous to its being drawn down.

The ring, end of this instrument is put in the mouth of the patient, and applied around the Tonsil, the inner part of the circle is then drawn back by the hand and removes the Tonsil with despatch and safety —

10 7083x May 25, 1832

The inventor has formed this instrument in a more simple manner but does not consider it quite as good as the one afore mentioned viz; The stem and ring, may be split all the way down and kept together by rings, so that the one part will slide past the other, causing the two sections of the ring, to pass each other, thereby performing the operation required –

In testimony that the above is a true Specification of my said improvement as above described I have hereto set my hand this 28th day of April A.D. 1832.

Witnesses
Saml Dale
Michl G. Dale

William B. Fahnestock (Recorded)

[illegible]

(Patented 25 May 1832)

(Drawings made from Specification)